United States Patent
Bhageria et al.

(10) Patent No.: US 9,858,848 B1
(45) Date of Patent: Jan. 2, 2018

(54) DYNAMIC DISPLAY ADJUSTMENT ON A TRANSPARENT FLEXIBLE DISPLAY

(71) Applicant: International Business Machines Corporation, Armonk, NY (US)

(72) Inventors: Gopal K. Bhageria, Kolkata (IN); Vijay Ekambaram, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 15/177,660

(22) Filed: Jun. 9, 2016

(51) Int. Cl.
G09G 3/20 (2006.01)
G06F 1/16 (2006.01)
G06F 3/01 (2006.01)

(52) U.S. Cl.
CPC ......... *G09G 3/2003* (2013.01); *G06F 1/1652* (2013.01); *G06F 3/013* (2013.01); *G06F 3/016* (2013.01); *G09G 2380/02* (2013.01)

(58) Field of Classification Search
CPC ........ G06F 1/1652; G06F 2203/04102; G09G 2380/02; H04M 1/0268; G09F 9/301
See application file for complete search history.

(56) References Cited

U.S. PATENT DOCUMENTS

| 8,970,455 B2 | 3/2015 | Thorson et al. |
| 2010/0149145 A1 | 6/2010 | Van Woudenberg et al. |
| 2011/0134144 A1* | 6/2011 | Moriwaki ............ G09G 3/3208 345/660 |
| 2011/0188189 A1 | 8/2011 | Park et al. |
| 2013/0271365 A1* | 10/2013 | Tziortzis ................... G06F 3/01 345/156 |
| 2014/0204509 A1* | 7/2014 | Park .................. G02F 1/133305 361/679.01 |

FOREIGN PATENT DOCUMENTS

| CN | 102413227 A | 4/2012 |
| CN | 203588141 U | 5/2014 |

OTHER PUBLICATIONS

Anthony; "LG's flexible and transparent OLED displays are the beginning of the e-paper revolution"; ExtremeTech; Jul. 14, 2014; 8 pages; <http://www.extremetech.com/computing/186241-lgs-flexible-and-transparent-oled-displays-are-the-beginning-of-the-e-paper-revolution>.

(Continued)

*Primary Examiner* — Koosha Sharifi-Tafreshi
(74) *Attorney, Agent, or Firm* — Walter L. Rudberg; A. Imtiaz Billah

(57) ABSTRACT

Embodiments of the present invention provide a method, computer program product, and a computer system for recommending one or more bend locations on a flexible display. According to one embodiment, the display is flexible and transparent, and the display includes at least one sensor. A set of data is received from the at least one sensor. Based on the received set of data the system detects whether, ambient light is reflected off the display at an angle directed at a first user. The system then determines a bend line location, wherein the bend line is a location to bend the display to obstruct reflected light from reaching the first user and sends an alert to the first user identifying the bend line location.

20 Claims, 6 Drawing Sheets

(56) References Cited

OTHER PUBLICATIONS

Gordon; "How to Get All Your Gadgets Ready for the Beach this Summer"; lifehacker; May 9, 2014; 5 pages; <http://lifehacker.com/5916747/how-to-get-all-your-gadgets-ready-for-the-beach-this-summer>.

Greenfield; "The Best E-Readers for Places with Lots of Sun and Sand"; The Wire; Jun. 18, 2013; 11 pages; <http://www.thewire.com/technology/2013/06/best-e-readers-places-lots-sun-and-sand/65991/>.

Hoffman; "E Ink vs. LCD: Which Screen is Best for Reading?"; How-To Geek; Feb. 3, 2014; 5 pages; <http://www.howtogeek.com/181577/e-ink-vs.-lcd-which-screen-is-best-for-reading/>.

Laur; "Galaxy S7 will feature a flexible display and a flexible body"; Flexible Display; Jul. 13, 2015; 18 pages; <http://www.flexible-display.net/>.

Massachusetts Institute of Technology (MIT); "Transparent Displays at MIT"; YouTube; Jan. 21, 2014; 4 pages; <https://www.youtube.com/watch?v=0aw58MUciWw>.

"Benefits of ePaper Technology: Readable and Low Power Consumption"; © 2016 E Ink Corporation a subsidiary of E Ink Holdings, Inc; Printed Mar. 18, 2016; 3 pages; <http://www.eink.com/benefits-of-eink-technology.html>.

"Transparent OLEDs: introduction and market status"; OLED-Info © 2004-2016 Metalgrass software; Printed Mar. 18, 2016; 3 pages; <http://www.oled-info.com/transparent-oleds>.

\* cited by examiner

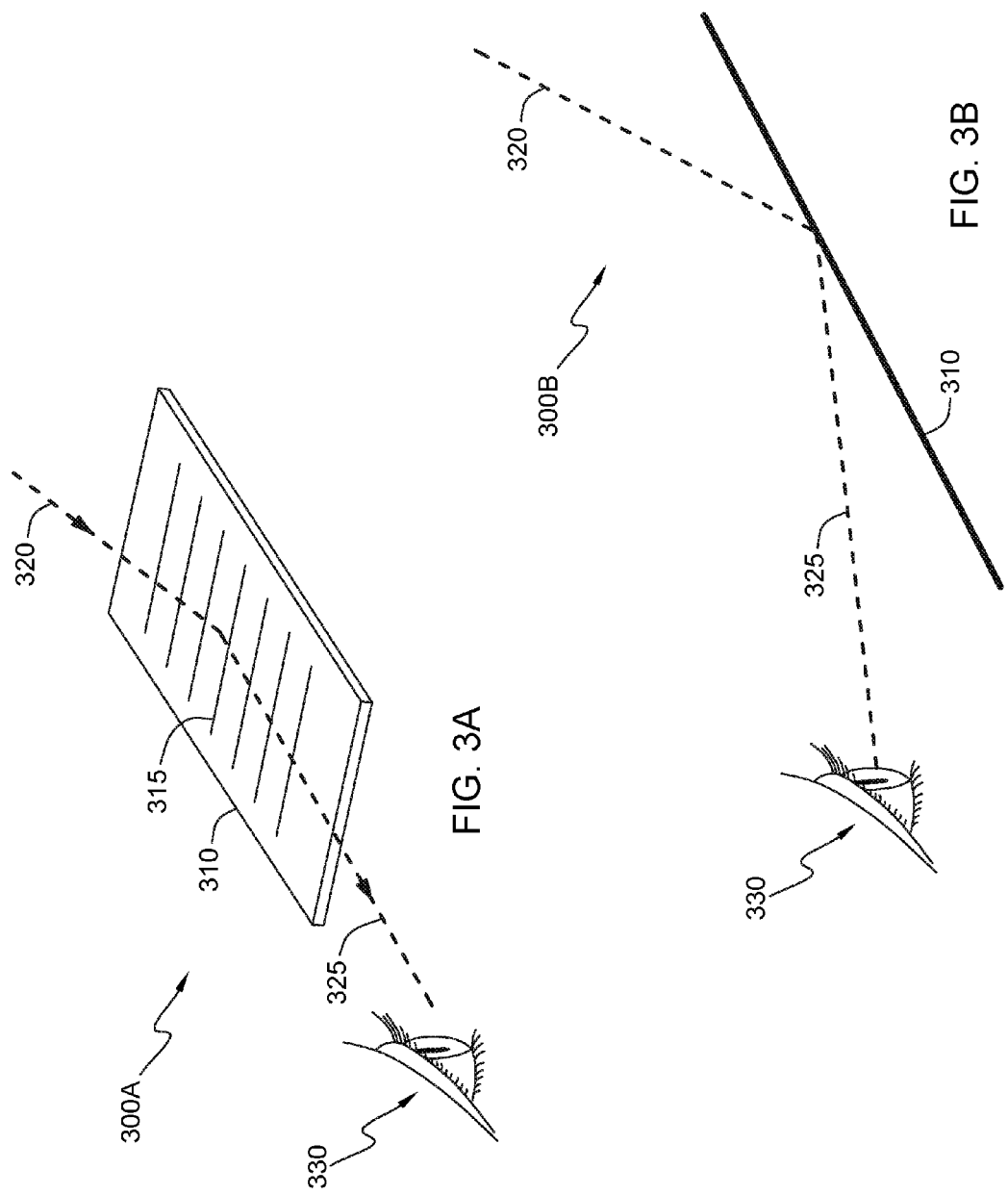

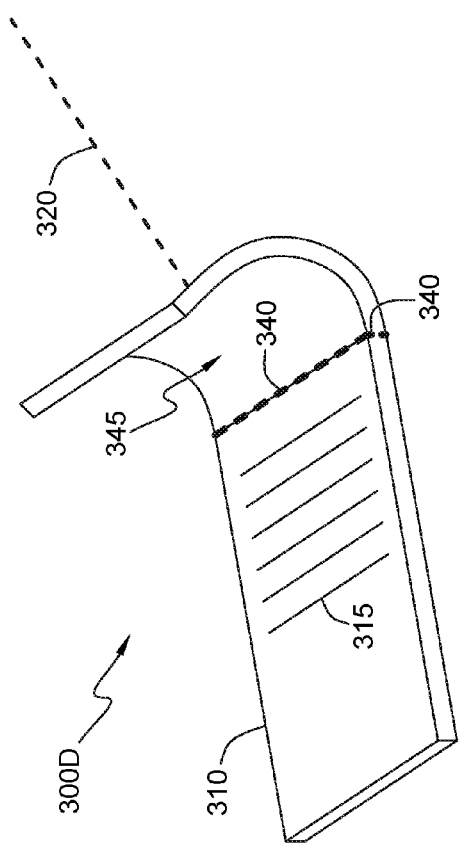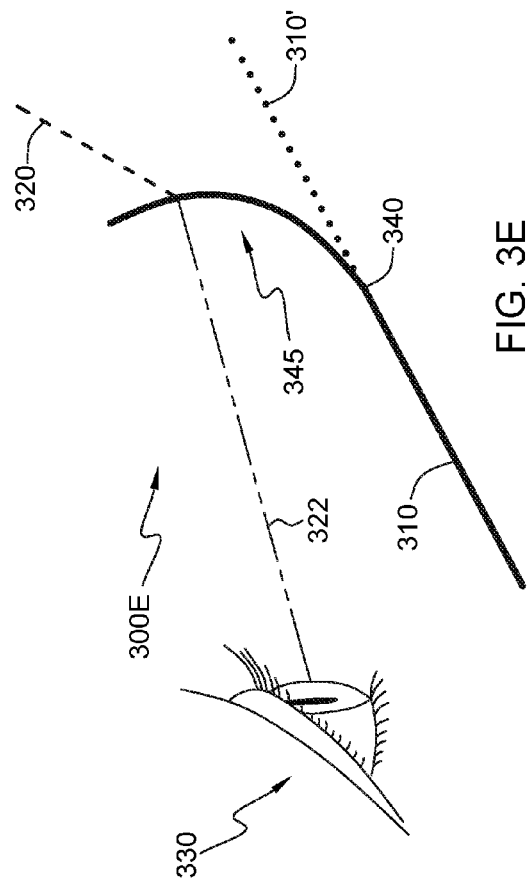

DYNAMIC DISPLAY ADJUSTMENT ON A TRANSPARENT FLEXIBLE DISPLAY

BACKGROUND OF THE INVENTION

The present invention relates generally to the field of displaying content, and more particularly to adjusting a transparent and flexible display to improve readability.

Transparent and flexible display screens are becoming more widespread. Many devices such as laptops, tablets, portable gaming consoles, TV's and mobile phones are utilizing such display screens. Devices which utilize a transparent display provide a user with the ability to view content on the display while maintaining a transparent nature. Further transparent and flexible displays allow a user to (1) bend and fold a display screen at different locations as well as (2) see what is on the display screen while still being able to see through the screen. Due to the transparent nature of such a devices, content on the display may become difficult to read in certain lighting conditions.

SUMMARY

According to one embodiment of the present invention, a method for recommending one or more bend lines in a flexible display is provided. The method may include: providing a display, wherein the display is flexible and transparent, and wherein the display includes at least one sensor; receiving, by one or more processors, a set of data from the at least one sensor; detecting, by one or more processors, from the received set of data that ambient light is reflected off the display at an angle directed at a first user; determining, by one or more processors, a bend line location, wherein the bend line is a location to bend the display to obstruct reflected light from reaching the first user; and sending, by one or more processors, an alert to the first user identifying the bend line location.

Another embodiment of the present invention provides a computer program product for recommending one or more bend lines in a flexible display, based on the method described above.

Another embodiment of the present invention provides a computer system for recommending one or more bend lines in a flexible display, based on the method described above

BRIEF DESCRIPTION OF THE DRAWINGS

FIGS. 3A & 3B depict a prospective view and a cross sectional view, respectively, of a transparent flexible display, displaying content with light reflecting off the transparent flexible display, in accordance with an embodiment of the present invention;

FIGS. 3D & 3E depict a prospective view and a cross sectional view, respectively, of a transparent flexible display, bending along a bending line, in accordance with an embodiment of the present invention;

DETAILED DESCRIPTION

Figure 1:
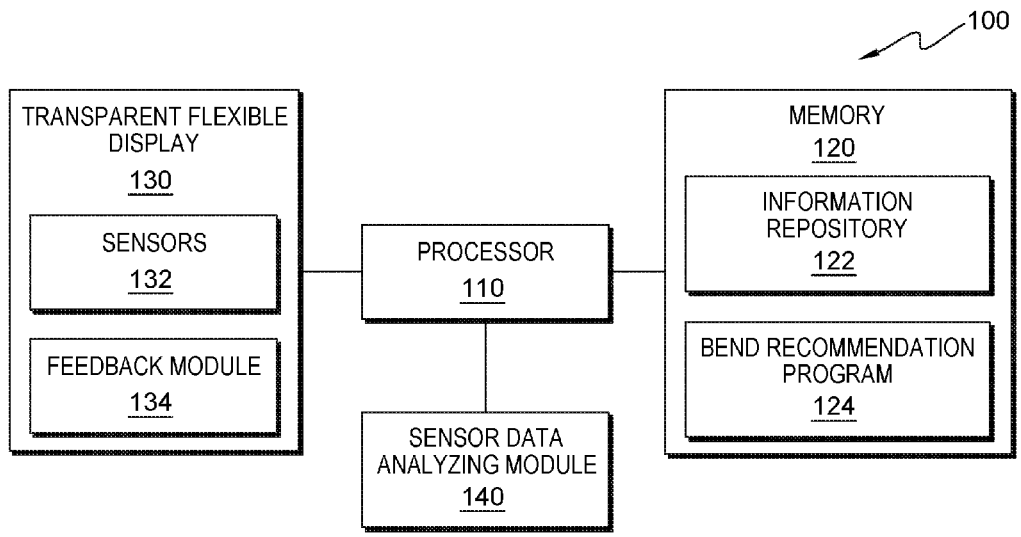
FIG. 1 is a functional block diagram of a computing device, in accordance with an embodiment of the present invention.

Transparent display devices allow a user to see what is shown on the display screen while still being able to see through the screen. Transparent displays can be used in many places like, the window of a house and mobile devices. The level of transparency of transparent displays can be changed programmatically, thereby allowing a transparent display to be changed from opaque to transparent, and any level of translucency between. When a transparent display is used for displaying text, or images in bright light then a user may have difficulty reading the content, as a reflection of light may create difficulty in seeing/reading the content.

Flexible display screens allow a user to bend, fold, and/or roll the display screen. A transparent flexible display has a flexible transparent structure such that the display is comprised of elements of a transparent flexible material. For example, when the substrate is made of a polymer material such as a plastic having a transparent nature, coupled with a transparent organic light emitting substance, the display will have a transparent flexible appearance.

The transparent flexible display is bendable and can be deformed by a force applied externally or by various internally configuration. In one scenario, a flexible display may be bent by an external force applied by a human. Alternatively, and/or additionally, bending the transparent flexible display, may be implement automatically by internal components. Regardless of the method of bending a transparent flexible display, the display can be manipulated into various shapes and/or contorted positions. For example, a flexible display can be folded on top of itself, bent, crooked, twisted, rolled like a scroll, and the like, all while maintaining display characteristics and its structural and electro-mechanical characteristics.

A transparent flexible display may be implemented with devices, such as a mobile phone, a smartphone, a portable multimedia player, a personal digital assistant (PDA), a tablet PC, a navigation system, or wearable technology, such as a smart watch. Similarly, a transparent flexible display may be implemented with a stationary display device, such as a monitor, TV, or a kiosk display.

Embodiments of the present invention provides systems and methods for dynamically adjusting the content readability of a transparent display during bright light, as well as if there is light reflecting off the display.

Embodiments of the present invention provide systems and methods for dynamically adjusting the content readability of a transparent display by recommending a bending line on the display to bend the transparent flexible display to reduce glare from a bright source of light. After the display screen is bent, the screen may also adjust the (i) content, (ii) color scheme, and/or (iii) transparency of the screen to improve its readability. For example the font size, font color, and screen color may change to restrict the surrounding light. Similar changes (i.e., font size, font color, and screen color may change) may be acted upon to accommodate external brightness.

The present invention will now be described in detail with reference to the Figures. Reference is now made to FIG. 1. FIG. 1 depicts a functional block diagram illustrating a computing device, generally designated 100, in accordance with an embodiment of the present invention. Modifications to computing device 100 may be made by those skilled in the art without departing from the scope of the invention as recited by the claims. In an exemplary embodiment, computing device 100 includes one or more processor(s) 110, memory 120, transparent flexible display 130 (hereinafter referred to as display 130), and sensor data analyzing module 140. Computing device 100 may be any electronic device capable of being implemented with a transparent flexible display, including, but not limited to, personal data organizers, handheld gaming platforms, cameras, mobile devices, and tablets.

Memory 120 includes information repository 122 and bend recommendation program 124. Memory 120 may include any suitable volatile or non-volatile computer readable storage media, and may include random access memory (RAM) and cache memory (not depicted in FIG. 1). Bend recommendation program 124 may be stored in a persistent storage component (not depicted) for execution and/or access by one or more of processor(s) 110 via one or more memories of memory 120. Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information.

Information repository 122 is a repository for data received from sensors 132. Information repository 122 stores the received sensor data from a bend in a device display, including display bend lines, bend radii, bend angles, bend durations, and bend frequencies, as well as, the pre-determined device bending thresholds.

Bend recommendation program 124 recommends an ideal bending line on the display to reduce and/or eliminate glare when the display is bent. Bend recommendation program 124 may analyze received data from sensors 132 to determine a bending line across display 130. Bend recommendation program 124 may identify the users viewing direction and angle of view through sensors 132. Further, bend recommendation program 124 may also identify the direction and quantity of light reflecting off the display through sensors 132. Bend recommendation program 124 may then correlate the users viewing direction with the direction of light to determine the extent and location of light reflecting off display 130 at the user. Bend recommendation program 124 may display on display 130 a recommended bending line for a user to bend display 130 to reduce and/or remove glare. Utilizing various sensors, bend recommendation program 124, may instruct display 130 to become opaque stopping light from directly falling on display 130 when displaying content.

Further, bend recommendation program 124 may utilize sensor data from either information repository 122 or sensors 132, and dynamically adjust the content on display 130 to enhance a user's ability to see and easily view the displayed content. For example, bend recommendation program 124 may analyze sensor data and extrapolate data to determine an appropriate adjustment of content on display 130. Bend recommendation program 124 may receive data about a bend in a display, analyze the data and then adjust the screen content accordingly for the best visibility to the user. For example, content may be readjusted to accommodate a smaller display size. For instance, content that would have been displayed on the bent portion of display 130 may be moved to the non-bent portion of display 130. Bend recommendation program 124 evaluates if display 130 is unreadable due to the bend in display 130. If any portion of the display is covered, or bent at an angle unreadable to user, bend recommendation program 124 may determine a new effective display screen and accordingly adjust the displayed content to fit the content on the display.

Additionally, bend recommendation program 124 may also adjust the level of transparency of the bent portion of display 130. By adjusting the level of transparency, bend recommendation program 124 restricts incoming light, thereby further improving the user's readability of display 130. Additionally, and/or alternatively, multiple portions of display 130 can be changed to a dark shade thereby limiting the level of transparency.

Bend recommendation program 124 may determine an ideal bend location to reduce and/or eliminate glare by displaying a line on display 130 whereby the user manually bends the display. Alternatively, and/or additionally, bend recommendation program 124 may determine an ideal bend location to reduce and/or eliminate glare and automatically bend at the recommended bend line through electroactive polymer (EAP) strips. For example, after identifying the ideal line location, bend recommendation program 124 may apply an appropriate electric field to EAP strips thereby bending display 130 at the determined location and at a determined amount. It is noted that FIGS. 3A-3E depict display 130 bending in one direction, however, bend recommendation program 124 may recommend bending in any direction, or recommend multiple bends in one or more directions, in order to reduce and/or eliminate glare.

Display 130 includes sensors 132 and feedback module 134. Display 130 is a graphical user interface, capable of displaying images (such as a still image or a moving image) generated by computing device 100. Display 130 is a display including a flexible substrate. For example, display 130 may be composed of any suitable flexible display, such as an organic light-emitting diode (OLED) display. The flexible characteristic allows for a free curving movement of display 130. Display 130 is also a transparent substrate. Display 130 may include touch-sensing capabilities. The content displayed on display 130 may include, but is not limited to: text, images, and videos. Additionally, properties of display 130 can vary between different devices, based on the size, shape, curvature, bendability, foldability and the like. In an exemplary embodiment, display 130 is entirely flexible. In an alternative embodiment, display 130 is bendable in only certain directions. In an alternative embodiment display 130 comprises at least one bendable display region and at least one non-bendable display region. Display 130 may have EAP strips built-into its substrate.

Sensors 132 are installed in the registers (not depicted in FIG. 1) of display 130 and are configured to detect (i) a viewing angle of the user; (ii) a viewing direction of the user; (iii) an amount of light reflecting off display 130; (iv) a received direction of light reflecting off display 130; (v) a curved state of display 130; (vi) an angle of view of a second user viewing display 130; (vii) a direction of view of a second user viewing display 130. Sensors 132 detect information about viewing angle(s) and direction(s) of at least one user viewing display 130. Sensors 132 detect information about viewing angle(s) and direction(s) of light which may reflect off of display 130 at user(s). Sensors 132 detect information about viewing angle(s) and direction(s) of a second user viewing display 130 without a user's permission. Sensors 132 detect information about where the display is bent including: the direction, the bending, and radius, among other information. Sensors 132 may be any sensor technology known in the art with the ability to detect and identify the number of user(s), viewing angle(s) of each user, and viewing direction of each user in respect to display 130. For example, sensors 132 may correspond to a plurality of sensors such as cameras, infrared sensors, thermal sensors, and the like. Sensors 132 may be any sensor technology known in the art with the ability to detect any bend and corresponding information in the display screen, such as pressure sensors, bending/stress sensors, accelerometers, strain gauges, and the like. Sensors 132 may also include sensors which can determine the angular position of display 130. For example sensors 132 may also include motion sensors, angular position sensors, linear position sensors, gyroscopes, etc. Sensors 132 may be any sensor technology known in the art with the ability to detect and measure external illumination and light, such as photo sensors, illumination sensors, and the like.

Feedback module 134 communicates to a user on display 130 indicating where display 130 should be bent to reduce and/or eliminate glare. Feedback module 134 may include visual, audio, and/or haptic feedback sensors to display and/or transmit an alert to a user where and how much display 130 is to be bent. For example, feedback module 134 may display a line across display 130 indicating a user is to bend the display at the indicated location to reduce glare.

Sensor data analyzing module 140 analyzes sensor data accessed from sensors 132 and/or information repository 122 to extrapolate data, along with the display manufacturer specifications and/or thresholds. It is noted, that embodiment 100 depicts sensor data analyzing module 140 for explanatory purposes only, in other embodiments (not shown) sensor data analyzing module 140 may be integrated with bend recommendation program 124.

Figure 2:
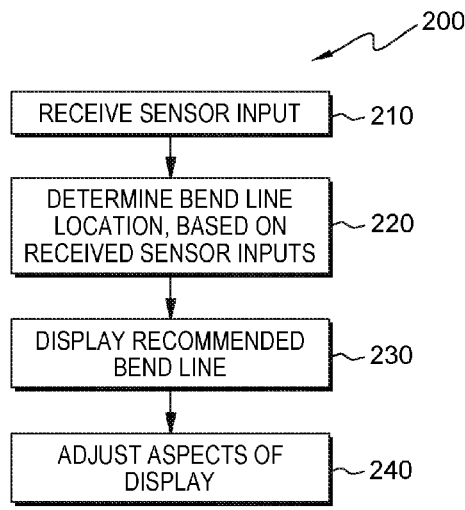
FIG. 2 depicts flowchart 200, illustrating operational steps for determining and recommending an optimal bending line on a flexible display device, in accordance with an embodiment of the present invention.

FIG. 2 depicts a flowchart illustrating the operational steps for determining and recommending an optimal bending line on a flexible display device, in accordance with an embodiment of the present invention.

Prior to step 210, bend recommendation program 124 may receive an indication initiate bend recommendation program 124 (i.e., button, gesture, predetermined movement of display 130, automatic detection of glare, etc.). For instance, if a user of computing device 100 finds difficulty in viewing content on display 130, the user may trigger the bend recommendation program 124. Alternatively, bend recommendation program 124 may upon detecting a glare and/or light reflecting off of display 130, automatically activate to determine an ideal bend line location to improve readability.

In step 210, bend recommendation program 124 receives sensor data from sensors 132, information repository 122 and/or sensor data analyzing module 140. In an embodiment, bend recommendation program 124 may receive and identify a user's viewing direction as well as the direction and amount of light through sensors 132. In an embodiment, bend recommendation program 124 may receive and identify a user's viewing direction as well as the direction and amount of light by analyzing data within information repository 122 by sensor data analyzing module 140. Thereafter, bend recommendation program 124 receives such information from sensor data analyzing module 140.

In step 220, bend recommendation program 124 analyzes the received sensor data, and determines the location of the recommended bending line. Bend recommendation program 124 analyzes the (i) direction of light, (ii) viewing direction, in order to determine the location of a bending line, to reduce and/or eliminate glare on display 130. Bend recommendation program 124 may determine if the incoming light is reflecting towards a user's eye. If it is determined that incoming light is reflecting towards the user's eye, then bend recommendation program 124 may determine a location to bend display to prevent reflection of light towards the user's eyes. For example, bend recommendation program 124 will determine a bending line to improve the readability of display 130 by considering the direction of incoming light and the user's viewing direction.

In an exemplary embodiment, sensors 132 include one or more cameras as well as illumination sensors installed on display 130. Cameras (Sensors 132) installed on display 130 may track a user's eye direction as well as a user's viewing direction. Cameras may be used to detect facial direction as well as the angle between the facial plane and display 130 surface plane. Similarly, illumination sensors (Sensors 132) installed on display 130 may track the direction, intensity and amount of light on display 130. The illumination sensors may allow bend recommendation program 124 to determine the direction of the incoming light as well as the direction of the reflected light. Therefore, based on the exemplary sensors 132, bend recommendation program 124 may determine if the incoming light is reflecting off display 130's surface towards the user's eye.

In an exemplary embodiment, bend recommendation program 124 may analyze the amount, and angle of incoming light as well as analyze the direction the user is viewing display 130. Thereafter, bend recommendation program 124 may determine if the incoming light is being reflected off of display 130 and directed towards a user's eye(s), based on the (i) analyzed incoming light; (ii) user direction; and (iii) the dimensions of display 130. Upon bend recommendation program 124 determining the incoming light is reflected off of display 130 towards the user's eye(s), bend recommendation program 124 may determine a location to bend display 130 to block and/or reduce light reflecting towards the user.

In an exemplary embodiment, bend recommendation program 124 may utilize facial recognition software. Facial recognition software may identify a person from sensors 132. For example, facial recognition software may detect if a person is squinting due to light reflecting off of display 130. Alternatively, and/or additionally, facial recognition software may detect if a person is struggling to read the content on display 130. In the previous example, bend recommendation program 124 may automatically analyze the incoming light and the user's direction, to determine if light is reflecting off of display 130 towards the user's eye.

In step 230 bend recommendation program 124 instructs the user as to the location of the recommendation bend of display 130 to prevent and/or minimize incoming light reflecting off of the display. For example, bend recommendation program 124 may display a recommended bend line on display 130 in consideration of the direction of incoming light and the user's viewing direction (see step 220). The user may then bend the display along the recommended line.

Alternatively, in step 230, if display 130 comprises EAP strips, bend recommendation program 124 may automatically bend itself at the determined location. For example, bend recommendation program 124 may automatically bend display 130 at the determined location (per step 220) by electronically deforming EAP strip (or other known means in the art) fixed at the backside of computing device 100, thereby bending display 130 at the recommended line, independent of a user's action.

Generally, EAP strips may change size or shape when stimulated by an electric field. Thereby, bend recommendation program 124 may accurately control the location, direction and degree of a bend in display 130 by simply activating and controlling the intensity of an electric field.

In step 240, bend recommendation program 124 may adjust various aspects of display 130 to further improve the readability of content. One aspect bend recommendation program 124 may adjust is the level of transparency of a portion of the display. For example, bend recommendation program 124 may turn the bent portion of display 130 opaque to restrict incoming light, allowing the user to read the content more easily. Bend recommendation program 124 may control the level of transparency of the bent portion of display 130 limiting incoming light. Accordingly, the bent portion of display 130 will be a determined dimmable level of opaque, thus blocking and/or absorbing incoming light. Further, the bent portion may provide a shadow on display 130, further providing improved content readability. For example, once display 130 is bent on the determined bend line, the level of transparency of the bent portion of display 130 will be changed to restrict incoming light, thereby improving the user's readability during bright light.

Bend recommendation program 124, may adjust the color contrast of display 130 to improve readability of content. For example, bend recommendation program 124 may determine an appropriate color contrast to display content on display 130. Based on sensors 132, bend recommendation program 124 may determine a content specific contrast to improve readability on display 130. For example, content may be displayed in dark portion with appropriate color contrast for text based on ambient and incoming light, in relation to the user's viewing angle. Alternatively, and/or additionally, a user may predefine a preferred contrast setting to be activated upon bending display 130.

Further, bend recommendation program 124 may determine the remaining portion of display 130, and then adjust the content within the remaining portion of display 130. The remaining portion of display 130 may be known as the effective display, as it is the portion of display 130 viewable to a user, after a bend is made. Bend recommendation program 124 may realign content on the transparent flexible display, based upon a detected bend in the display, if the bend obstructs or covers a portion of content. In an exemplary embodiment, content may be re-aligned, shifted, and/or adjusted on display 130, adapting to the bend or curvature of the device to enable easy readability of content on display 130. Further, bend recommendation program 124 may analyze the current information and content depicted on display 130, including, but not limited to, font, alignment, and images. Thereafter, to accommodate the new effective viewing area of display 130, bend recommendation program 124, may reduce and/or realign any text, images, video, etc.

Following step 240, in an embodiment, sensors 132 may become inactive to preserve battery life. In an alternative embodiment, sensors 132 will remain active in order to automatically analyze the readability of the content on display 130.

Figure 3C:
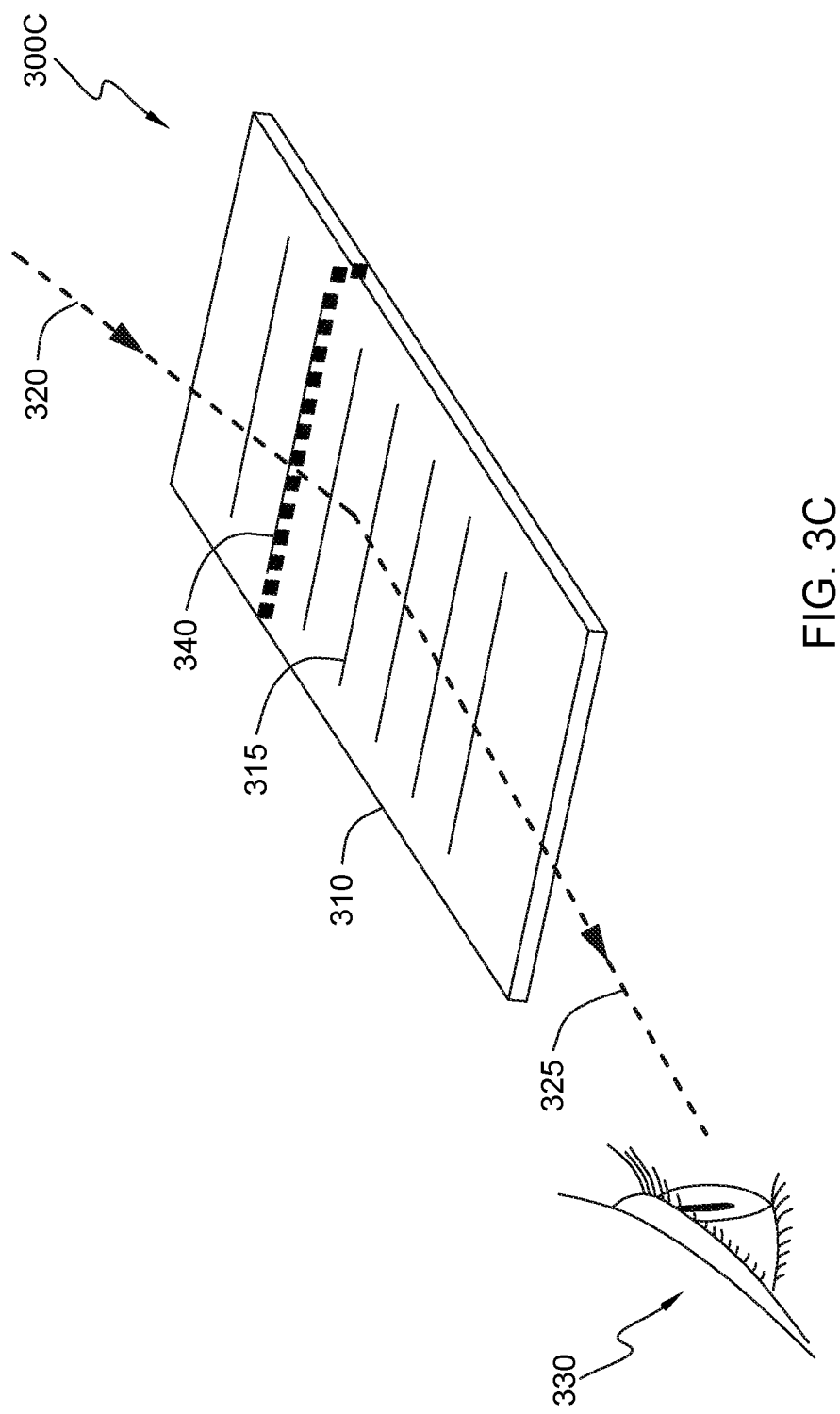
FIG. 3C depicts a transparent flexible display displaying an exemplary recommended bending line, in accordance with an embodiment of the present invention.

Reference is now made to FIGS. 3A, 3B, 3C, 3D and 3E. FIGS. 3A & 3B depict a perspective view and a cross sectional view, respectively, of a transparent flexible display, displaying content with light reflecting off the transparent flexible display. FIG. 3C depicts a transparent flexible display, with a recommended bending line. FIGS. 3D & 3E depict a perspective view and a cross sectional view, respectively, of a transparent flexible display, bending along a bending line.

FIG. 3A depicts environment 300A, portraying how reflection and/or glare from a light source may create difficulty for a user while reading any content in transparent display. It is noted, that device 310 is not bent, therefore, incoming light 320 reflects off device 310 into user's eye 330. Similarly. FIG. 3B portrays a cross sectional view device 310 of FIG. 3A. Direct incoming light 320, from a light source (not shown) reflects off device 310 altering its angle and thereby reflecting light 325 into a user's eye 330. Device 310 is a transparent flexible display similar to that of computing device 100. Device 310 displays content 315. Reflected light 325 may cause difficulty for user eye 330 to see the content 315 on device 310.

FIG. 3C depicts step 230, whereby bend recommendation program 124 recommends a bending line 340 to restrict incoming light 320. Per step 220, bend recommendation program 124, analyzes the direction and angle of incoming light 320, as well as viewing direction and angle of user 330, to determine and recommend bend line 340 to restrict incoming light 320. In an exemplary embodiment, bend recommendation program 124 may recommend the location of bend line 340 to block incoming light 320 and prevent reflected light 325.

FIG. 3D portrays device 310 bent along bend line 340 in order to restrict incoming light 320. Similarly, FIG. 3E, portrays a cross sectional of device 310 of FIG. 3D. FIGS. 3D and 3E may be bent manually, for example, by a user or may be bent automatically by EAP strips. The bent portion of display 345, may be opaque (per step 240) in order to restrict incoming light 320. It is noted that in FIG. 3E, incoming light 320 is significantly reduced and/or eliminated as depicted by line 322 as from device 310 to user's eye 330. In one exemplary embodiment content may be shifted to fit on be on bent portion of display 345. In one exemplary embodiment, bent portion of display 345 may display content. In this scenario, content 315 may be dynamically changed to maintain readability ease. For example, bent portion of display 345 background may be black with white text. It is noted that in FIG. 3E device 310' is the original location of device 310, above bend line 340, prior to becoming bent portion of display 345. When incoming light 320, is no longer an issue, bent portion of display 345 may be laid flat, over 310', whereby device 310 is flat again.

Figure 4:
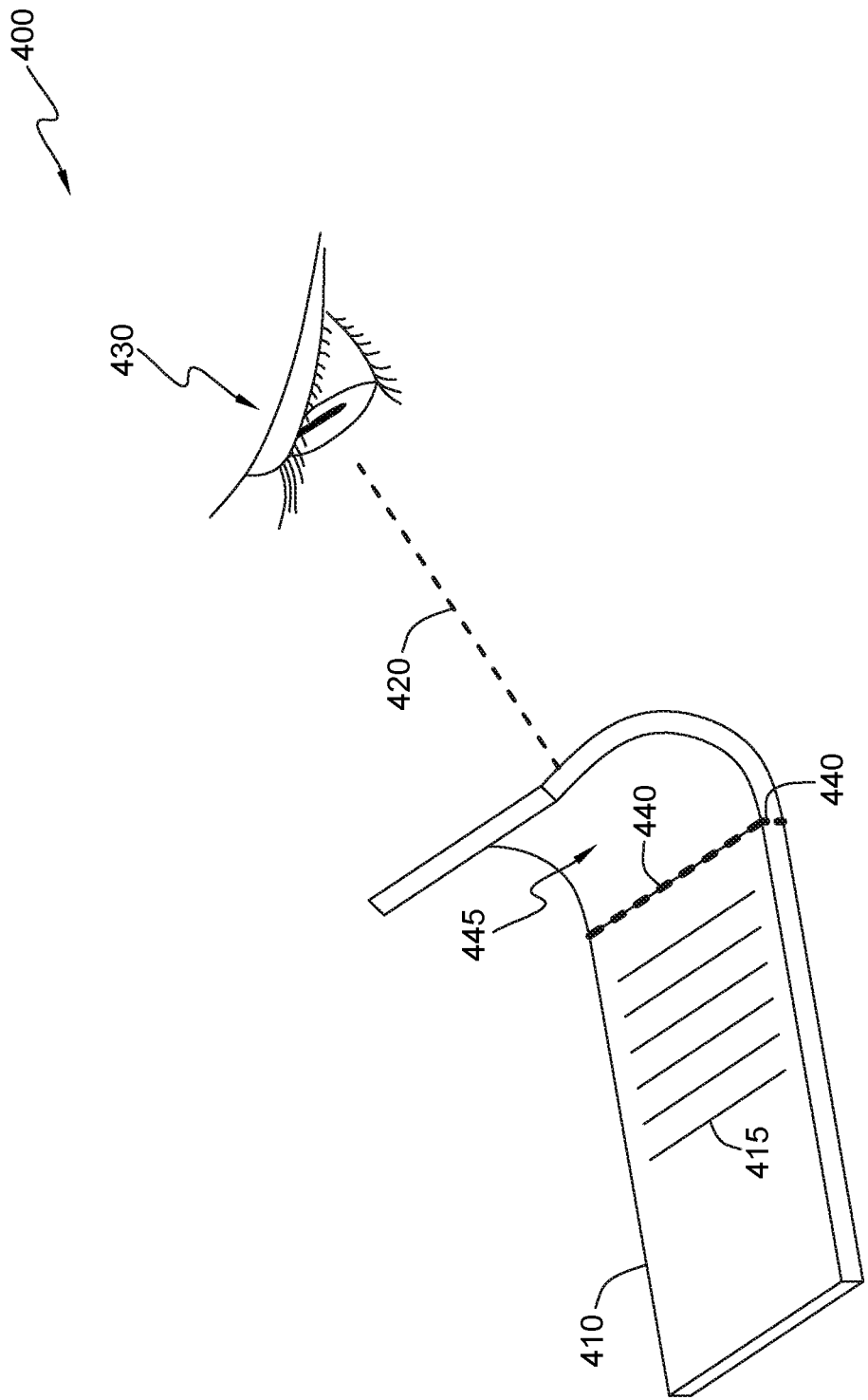
FIG. 4 depicts a transparent flexible display, preserving privacy, in accordance with an embodiment of the present invention.

Reference is now made to FIG. 4 depicting another embodiment of the present invention. FIG. 4 depicts a transparent flexible display, preserving privacy, in accordance with an embodiment of the present invention. In an exemplary embodiment, FIG. 4 portrays a transparent flexible display detecting and thereby preventing an intruder from viewing the screen. Utilizing sensors 132, bend recommendation program 124 (or sensor data analyzing module 140) may determine eye vector 420 (the line of sight) of intruder 430. In this scenario, bend recommendation program 124 may suggest an appropriate bend line 440 and block readability of the display from intruder 430. For example, an embodiment may, detect an intruder by comparing the eye-vector 420 of intruder 430 to that of user's viewing direction (not shown), and determine that intruder 430 is viewing content 415. Bend recommendation program 124 may then activate and prevent intruders from viewing content 415 on device 410. Based on eye-vector of intruder 430 capture, appropriate bend line(s) 440 could be generated similar to the aforementioned bend lines to restrict incoming light (similar to step 230). Thereafter, device 410 may be manually bent along bend line and/or automatically bent along bend line 440, using, for example, EAP strips. Thereafter bent portion 445 of device 410 may become opaque thereby preventing intruder 430 from viewing content 415.

Figure 5:
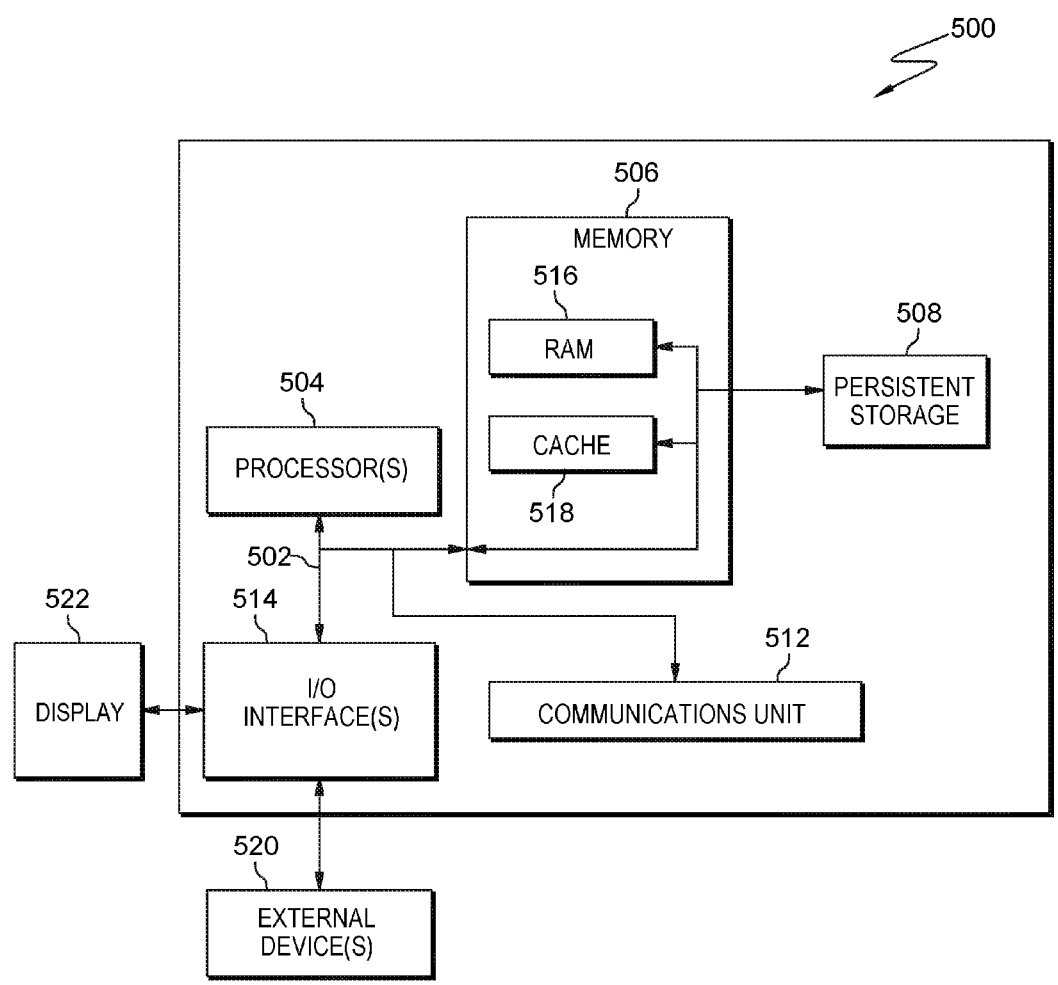
FIG. 5 is a block diagram of the internal and external components of a computer system, in accordance with an embodiment of the present invention.

FIG. 5 is a block diagram of internal and external components of a computer system 500, of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, wearable computing devices, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media. Software (e.g., bend recommendation program 124) is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 512 provides for communications with other computer systems or devices via a network. In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
providing a display, wherein the display is flexible and transparent, and wherein the display includes at least one sensor;
receiving, by one or more processors, a set of data from the at least one sensor;
detecting, by one or more processors, from the received set of data that ambient light is reflected off the display and at an angle directed at a first user;
determining, by one or more processors, a bend line location, wherein the bend line is a location to bend the display to obstruct reflected light from reaching the first user; and
sending, by one or more processors, an alert to the first user identifying the bend line location.

2. The method of claim 1, further comprising:
detecting, by one or more processors, that a second user is viewing the display, based in part on a received second set of data; and
responsive to detecting the second user is viewing the display, determining, by one or more processors, a bend line location which obstructs the second user from viewing the display.

3. The method of claim 1, wherein the bend line location comprises two or more bend line locations on the display.

4. The method of claim 1, further comprising:
activating, by one or more processors, an electroactive polymer strip, wherein activating the electroactive polymer strip automatically bends the display along the determined bend line location at a determined angle and magnitude.

5. The method of claim 1, further comprising:
detecting, by one or more processors, the display is bent along the determined bend line location; and
adjusting, by one or more processors, a level of transparency on the display, based on the ambient light, wherein a first portion of the display is a first transparency level and a second portion of the display is a second transparency level.

6. The method of claim 1, further comprising:
adjusting, by one or more processors, content on the display to fit within a non-bent portion of the display, wherein the non-bent portion of the display comprises a portion of the display other than the location of the bend line.

7. The method of claim 1, further comprising:
adjusting, by one or more processors, color contrast on the display based on the measure of the ambient light, wherein a first portion of the display is a first color and a second portion of the display is a second color.

8. The method of claim 1, wherein the set of data from the at least one sensor comprises at least one of:
a viewing angle of the first user relative to the display; and
a distance between the first user and the display.

9. The method of claim 1, wherein the alert to the first user as to the bend line location comprises at least one of: visual feedback, audio feedback, and haptic feedback.

10. The method of claim 1, wherein determining, the bend line location, comprises: a location of the bend line, a direction of the bend, a duration of the bend, and a radius of the bend line.

11. A computer program product comprising:
one or more computer readable storage media; and program instructions stored on the one or more computer readable storage media, the program instructions comprising:
program instructions to provide a display, wherein the display is flexible and transparent, and wherein the display includes at least one sensor;
program instructions to receive a set of data from the at least one sensor;
program instructions to detect from the received set of data that ambient light is reflected off the display and at an angle directed at a first user;
program instructions to determine a bend line location, wherein the bend line is a location to bend the display to obstruct reflected light from reaching the first user; and program instructions to send an alert to the first user identifying the bend line location.

12. The computer program product of claim 11, further comprising:
program instructions to detect that a second user is viewing the display, based in part on a received second set of data; and
responsive to detecting the second user is viewing the display, program instructions to determine a bend line location which obstructs the second user from viewing the display.

13. The computer program product of claim 11, further comprising:
program instructions to activate an electroactive polymer strip, wherein activating the electroactive polymer strip automatically bends the display along the determined bend line location at a determined angle and magnitude.

14. The computer program product of claim 11, further comprising:
program instructions to detect the display is bent along the determined bend line location; and program instructions to adjust a level of transparency on the display, based on the ambient light, wherein a first portion of the display is a first transparency level and a second portion of the display is a second transparency level.

15. The computer program product of claim 11, further comprising:
program instructions to adjust content on the display to fit within a non-bent portion of the display, wherein the non-bent portion of the display comprises a portion of the display other than the location of the bend line.

16. A computer system comprising:
one or more computer processors;
one or more computer readable storage media;
program instructions stored on the one or more computer readable storage media for execution by at least one of the one or more processors, the program instructions comprising:
program instructions to provide a display, wherein the display is flexible and transparent, and wherein the display includes at least one sensor;
program instructions to receive a set of data from the at least one sensor;
program instructions to detect from the received set of data that ambient light is reflected off the display and at an angle directed at a first user;
program instructions to determine a bend line location, wherein the bend line is a location to bend the display to obstruct reflected light from reaching the first user; and
program instructions to send an alert to the first user identifying the bend line location.

17. The computer system of claim 16, further comprising:
program instructions to detect that a second user is viewing the display, based in part on a received second set of data; and
responsive to detecting the second user is viewing the display, program instructions to determine a bend line location which obstructs the second user from viewing the display.

18. The computer system of claim 16, further comprising:
program instructions to activate an electroactive polymer strip, wherein activating the electroactive polymer strip automatically bends the display along the determined bend line location at a determined angle and magnitude.

19. The computer system of claim 16, further comprising:
program instructions to detect the display is bent along the determined bend line location; and
program instructions to adjust a level of transparency on the display, based on the ambient light, wherein a first portion of the display is a first transparency level and a second portion of the display is a second transparency level.

20. The computer system of claim 16, further comprising:
program instructions to adjust content on the display to fit within a non-bent portion of the display, wherein the non-bent portion of the display comprises a portion of the display other than the location of the bend line.

\* \* \* \* \*